United States Patent [19]

Tyler

[11] 4,003,395
[45] Jan. 18, 1977

[54] QUICK-OPENING VALVE OPERATED BY EXPLOSIVE CHARGE

[75] Inventor: Maurice Eugene Tyler, Orinda, Calif.

[73] Assignee: Systron Donner Corporation, Berkeley, Calif.

[22] Filed: July 28, 1975

[21] Appl. No.: 599,866

[52] U.S. Cl. .................... 137/68 A; 169/19
[51] Int. Cl.² ............ F16K 13/06; A62C 37/06
[58] Field of Search ........... 169/19, 28; 137/68 A, 137/70; 220/261

[56] References Cited

UNITED STATES PATENTS

| | | | |
|---|---|---|---|
| 2,877,780 | 3/1959 | Whitley et al. | 137/68 A |
| 3,202,162 | 8/1965 | Eckardt et al. | 137/68 A |
| 3,260,272 | 7/1966 | Eckardt | 137/68 A |
| 3,332,432 | 7/1967 | Marsh | 137/68 A |
| 3,333,641 | 8/1967 | Hansom et al. | 169/28 X |
| 3,494,370 | 2/1970 | Wahl et al. | 137/68 A |
| 3,757,810 | 9/1973 | Covarrubias | 137/68 A |

Primary Examiner—Evon C. Blunk
Assistant Examiner—Andres Kashnikow
Attorney, Agent, or Firm—Flehr, Hohbach, Test, Albritton & Herbert

[57] ABSTRACT

A quick-opening valve is disclosed for use in opening flow through a passageway from a source of pressurized fluid, such as a fire extinguisher fluid. The valve comprises a valve body in which a flow-blocking member is mounted to form a portion of the passageway. In one embodiment an imperforate plug is mounted within tubing to form the flow-blocking member, and a pair of weakened zones are formed by circular grooves in the tubing at opposite axial ends of the plug. In another embodiment the plug is formed integral with hollow cylindrical walls to form the flow-blocking member. A deflagrating charge is mounted in the valve body for generating explosive gas pressure so that the weakened zones are sheared. A slug which includes the plug is ejected in a direction at right angles to the passageway and into a slug receiving chamber. The ejected slug is deflected by a ramp to absorb excess energy. A one-way spring detent prevents the slug from rebounding back into the passageway and obstructing fluid flow.

3 Claims, 7 Drawing Figures

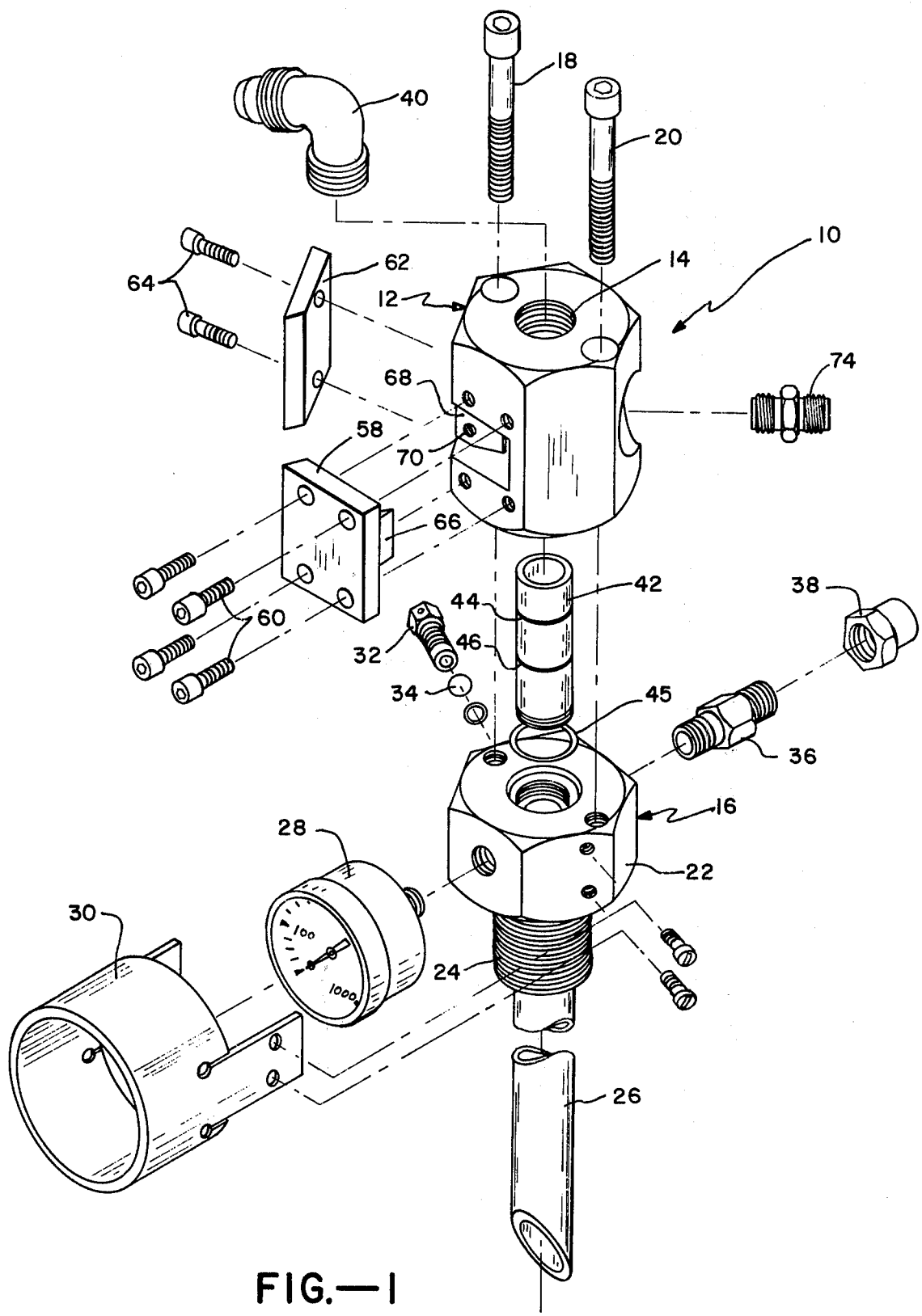
FIG.—1

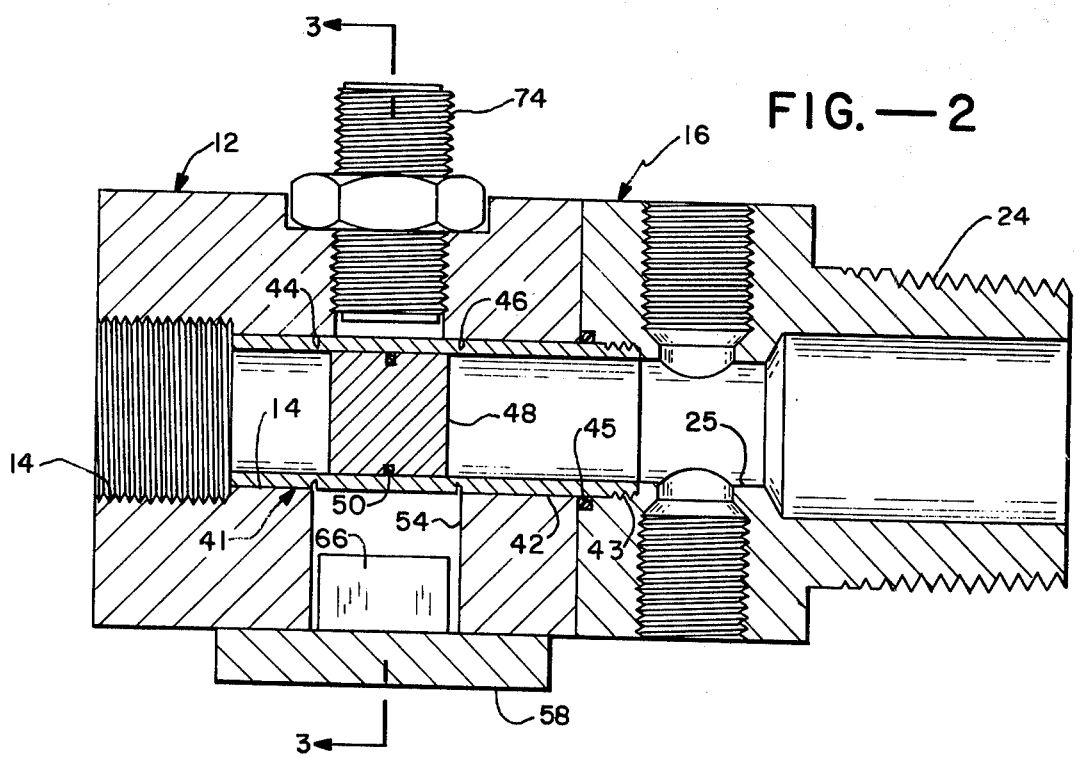
FIG.—2
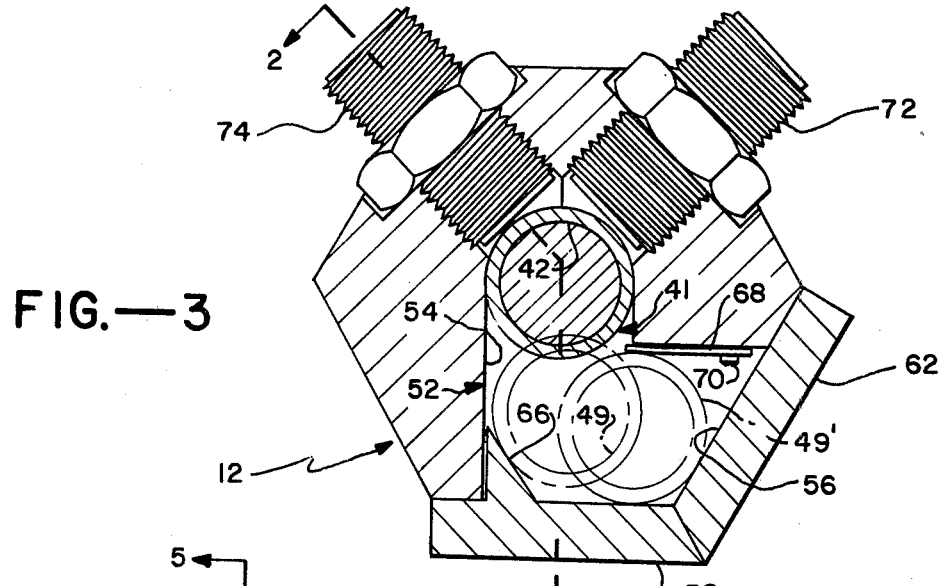
FIG.—3
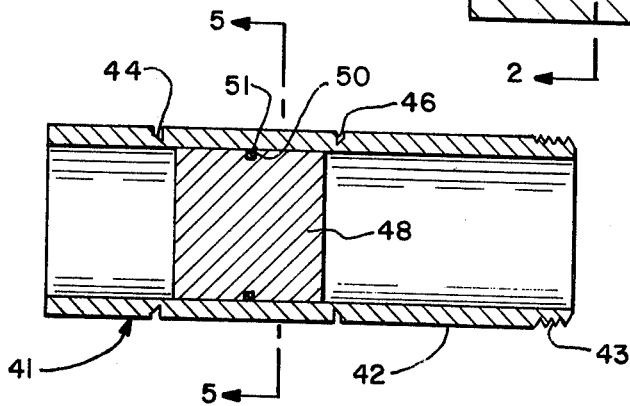
FIG.—4

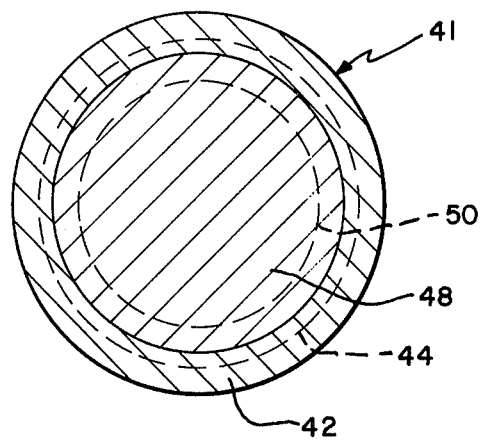
FIG.—5
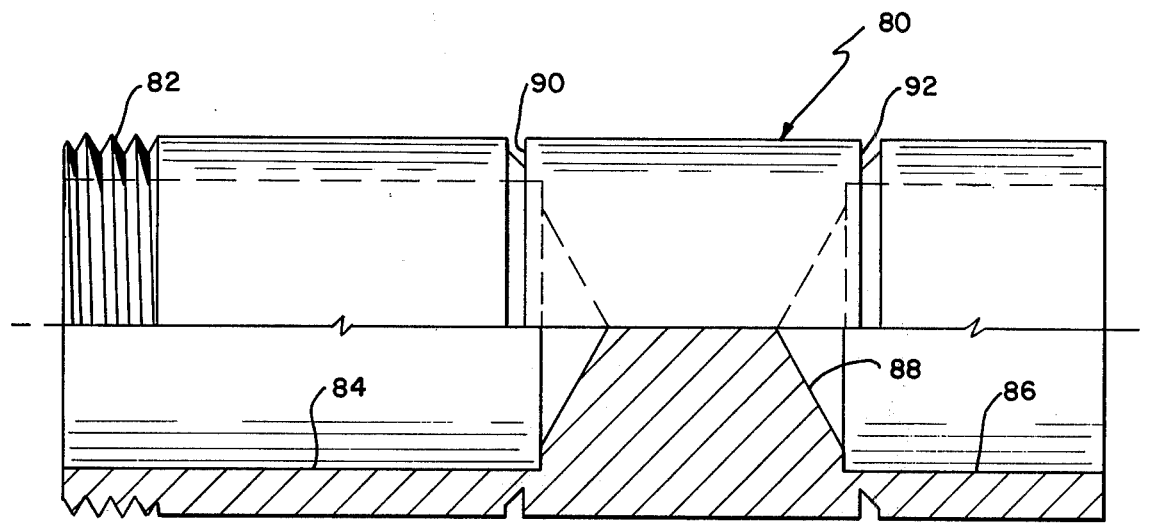
FIG.—6
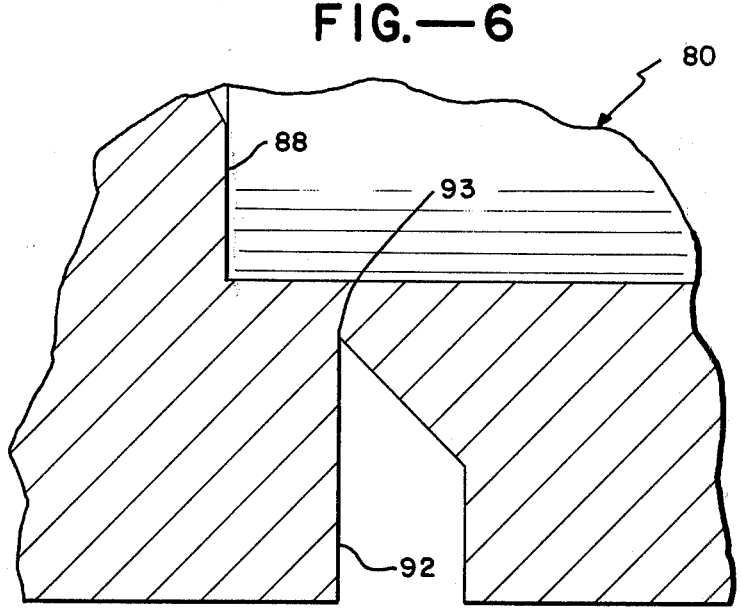
FIG.—7

QUICK-OPENING VALVE OPERATED BY EXPLOSIVE CHARGE

BACKGROUND OF INVENTION

This invention relates in general to quick-opening valves of the types used for controlling flow from a fluid pressure source into a distribution circuit.

Heretofore explosive actuated valves have been employed for quickly opening flow from a source of pressurized fluid. Such valves have been used in fire extinguisher applications, such as in aircraft where the valves are used to open flow from pressurized fire extinguisher tanks to engine nacelles.

Conventional valves of the type described employ explosive charge means which ruptures a disc or diaphragm mounted across a flow passage leading from the pressurized fluid reservoir. However, when such valves are operated, parts of the ruptured diaphragm or disc project into the flow passage, thereby tending to restrict the flow rate. The projecting remnant parts of the ruptured diaphragm or disc create an undesirable throttling effect which impedes the rapid distribution of fluid. This restriction in the flow rate is particularly objectionable in fire extinguisher systems where it is desirable to immediately route the fluid to the fire zones, such as in engine nacelles.

OBJECTS AND SUMMARY OF THE INVENTION

It is a general object of the invention to provide a new and improved quick-opening valve of the explosive charge type used for controlling flow from a reservoir containing a fluid under pressure.

Another object is to provide a valve of the type described which is adapted for opening communication from a pressure vessel containing a fire extinguisher fluid into a circuit which distributes the fluid to one or more fire extinguishing zones.

Another object is to provide a valve of the type described in which the explosive charge acts against and shears a slug in a manner which moves the slug along a path at right angles to the fluid flow passage and into a slug-receiving chamber.

Another object is to provide a valve of the type described in which an outlet passageway from a pressure vessel is normally blocked by a plug in a section of tubing which is sheared by an explosive charge in a manner such that the sheared tubing and plug are moved clear of the passage to permit unimpeded flow of a fluid from the vessel.

The invention in summary comprises a valve having a body formed with a passageway which is connected to the outlet of a vessel containing pressurized fluid, such as fire extinguisher fluid. A flow-blocking member is positioned in the passageway to normally block flow from the vessel. In one embodiment the flow-blocking member comprises a hollow conduit containing an imperforate plug. In another embodiment the flow-blocking member comprises a plug formed integral with hollow cylindrical walls. A pair of grooves which define weakened zones are formed about opposite ends of the plug to provide a shearable slug. A slug-receiving chamber is formed in the valve body radially adjacent the slug, and deflagrating charge means is provided in the body on an opposite radial side of the slug. An explosive charge of gas is created upon actuation of the charge means and the gas acts against the outer surface of the flow-blocking member to shear the slug and move the same in a direction of right angles to the passageway and into the slug-receiving chamber. A ramp surface is provided in the chamber to deflect the slug along a path into another portion of the chamber where it is captured by a spring detent clear of the passageway to permit unimpeded discharge or the fluid from the pressure vessel.

The foregoing and additional objects and features of the invention will become apparent when the foregoing description is read in conjunction with the accompanying drawings.

BRIEF DESCRIPTION OF THE DRAWINGS

FIG. 1 is a perspective exploded view of a valve assembly made in accordance with one embodiment of the invention.

FIG. 2 is a vertical sectional view of component elements of the assembly shown in FIG. 1.

FIG. 3 is a cross sectional view taken along the line 3—3 of FIG. 2.

FIG. 4 is an enlarged cross sectional view of a component element of the valve assembly.

FIG. 5 is a cross sectional view taken along the line 5—5 of FIG. 4.

FIG. 6 is an axial sectional view of a component element of another embodiment of the invention.

FIG. 7 is an enlarged fragmentary view of the element of FIG. 6.

DESCRIPTION OF THE PREFERRED EMBODIMENT

In the drawings FIG. 1 illustrates generally at 10 a quick-opening valve assembly of the invention specially adapted for use in a fire extinguishing system, such as a system for extinguishing fires in engine nacelles.

Valve assembly 10 includes a valve body 12 of hexagonal external configuration formed with a central bore 14 which defines a flow passageway through the valve. Valve body 12 is mounted above a manifold 16 by means of a pair of cap screws 18, 20.

Manifold 16 is formed at its upper end with an hexagonal shoulder 22 and at its lower end with a threaded stem 24 adapted for threading engagement with a discharge opening of the pressure vessel, or reservoir, not shown. The manifold is formed with a bore 25 which communicates with a dip tube 26 mounted below stem 24. The dip tube extends downwardly into the pressure vessel which contains the desired pressurized fluid. For fire extinguisher applications a suitable extinguisher fluid such as bromochlorodifluromethane is contained in the vessel under a pressure on the order of 600 psi. A pressure gauge 28 mounted through one face of the manifold provides a reading of the reservoir pressure, and a guard 30 is also mounted on the manifold to protect the gauge from damage. A pressure relief plug 32 containing a suitable burstable diaphragm 34 is mounted through another face of the manifold, and a fill plug 36 and cap 38 are mounted through another face for purposes of filling the reservoir with the fluid. An E1 fitting 40 is threadably mounted in the outlet of valve bore 14. The E1 fitting is adapted for connection with tubing in a suitable fire extinguisher distribution circuit, not shown, which directs the fluid to various end use zones, such as engine nacelles.

A flow-blocking member 41 is mounted coaxially within the passageway of bore 14 to normally block flow from the pressure vessel. The member 41 includes a hollow cylindrical conduit 42 comprising a section of pipe or tubing which is mounted concentrically within bore 14 of the valve body. The lower end 43 of the conduit is threaded for coupling with the upper end of manifold bore 25. An O-ring seal 45 is mounted in a groove between the conduit and manifold. A pair of axially spaced-apart grooves 44, 46 are formed about the conduit, with the groove depths being sized to provide controlled wall thicknesses with respect to the inner diameter of the conduit. The grooves thereby define weakened zones so that the intermediate portion of the conduit is sheared by explosive gas pressure in a manner to be described. In one specific application (given by way of example only), where the conduit 42 is fabricated from metal tubing with an inner diameter of 0.485 inches, the grooves are formed so that the controlled wall thicknesses at the weakened zones are 0.010 ± 0.001 inches.

As best shown in FIG. 4 an imperforate cylindrical plug 48 is mounted within conduit 42 with the opposite axial ends of the plug being positioned adjacent respective grooves 44 and 46. The plug provides structural support for the intermediate portion of the conduit between the grooves upon explosion of the charge as the weakened zones shear. The sheared conduit portion together with the plug form a slug 49 which is ejected from the passageway along a path at right angles to the direction of fluid flow as depicted in FIG. 3.

Plug 48 further creates a fluid pressure seal within the conduit for purposes of normally closing flow from the pressure vessel. An annular groove 50 is formed about the midspan of the plug and this groove is filled with fusible material 51 such as silver solder. The plug is then either furnace or torch brazed for fusing the solder and sealing the clearance between the plug and conduit.

Sealing may also be enhanced by forming the outer diameter of the conduit 42 in a close tolerance fit with the inner diameter of the valve body bore 14 and using a viscous sealant, such as a silicone-type grease or rubber, to fill both the grooves 44 and 46 and the clearances between the conduit and inner surface of the valve body.

Valve body 12 is formed with a generally L-shaped slug-receiving chamber 52. The chamber 52 includes a rectangular cross sectional portion 54 which is sized commensurate with the longitudinal sectional configuration of slug 49. Chamber portion 54 extends radially to the center line of bore 14 to guide the sheared slug along its ejection path. Another chamber portion 56 is formed in the valve body on one side of the portion 54. One outer side of the slug receiving chamber is closed with a plate 58 mounted by a plurality of bolts 60 to a face of valve body 12, and the adjacent side of the chamber is closed by a second plate 62 mounted by bolts 64 to another face of the valve body. Plate 58 is formed with an inwardly-projecting wedge portion 66 which defines an inclined ramp surface in the path of slug movement for deflecting the slug into chamber portion 56. Detent means comprising a leaf spring 68 is mounted by machine screws 70 into the inner side of the chamber wall with the distal end of this spring extending in a direction toward conduit 42 and projecting into chamber 52 sufficient to allow unidirectional passage of the sheared slug 49 into chamber portion 56 via incline 66 where it is held clear of the passageway through the conduit. Plate 58 is dismounted following operation of the valve to facilitate removal of the slug.

Deflagrating charge means in provided for generating explosive gas pressure for shearing slug 49. The charge means includes a pair of squib cartridges 72, 74 threadedly mounted in openings formed through faces of valve body 12 on the outside of conduit 42 at a position generally opposite of the slug receiver chamber. A pair of the cartridges is provided for redundancy. The cartridges are operated by suitable electrical or mechanical devices, not shown. In fire extinguishing applications the cartridges are operated responsive to suitable temperature sensors in the fire protection zones, such as engine nacelles.

In operation of the embodiment of FIGS. 1–5, it will be assumed that valve assembly 10 is mounted onto a reservoir containing a fire extinguisher fluid under pressure, with E1 fitting 40 connected in a circuit leading to engine nacelles. Squib cartridges 72 and 74 are connected through an electrical circuit with temperature sensors in the nacelles. When temperature levels in the nacelles exceed pre-determined limits, the sensors actuate the cartridges which generate explosive gas pressure. The gas pressure acts against the outer surface of conduit 42 and shears slug 49 along the grooves, with structural support for the sheared conduit portion being provided by plug 48. The slug is rapidly moved at right angles to the axis of the conduit into slug-receiving chamber 52 where it is deflected by the surface of wedge 66 into chamber portion 56, with leaf spring 68 serving to capture the slug at 49' within the chamber. Fluid from the pressure reservoir is then free to immediately flow through bore 14 of the valve body without being restricted by the sheared slug. The fluid is directed into E1 fitting 40 and through the distributor circuit to the engine nacelles where the fluid is available for extinguishing fires.

FIGS. 6 and 7 illustrate another embodiment of the invention providing a flow-blocking member 80 which is of integral construction. This flow-blocking member is fabricated from a cylindrical section of suitable metal bar stock. The outer diameter of the bar stock is machined for a close tolerance fit with the inner diameter of the bore of a valve body which is similar in construction to that described for the embodiment of FIGS. 1–5. External threads 82 are formed about one end of member 80 for threading engagement with internal threads formed within the manifold which is coupled to the end of the valve body, in the manner previously described. A pair of coaxial bores 84, 86 are formed through opposite ends. of the member to a predetermined axial depth so that the mid-portion of the bar stock separating the end faces of the bores defines an integral plug 88 which normally blocks fluid flow from the pressure vessel.

A pair of circular grooves 90, 92 are formed about the outer surface of member 80 at axially spaced positions adjacent opposite ends of plug 88. As best illustrated in FIG. 7 the typical groove 92 is machined to a precise depth in the wall of bore 88 so that its 45° V-shaped bottom point 93 establishes a controlled thickness in the bore wall to produce the weakened zone at which the slug can be sheared by the external gas pressure created by operation of the deflagrating charge. In one specific application (given by way of example only), where member 80 is fabricated from bar stock of cold rolled steel having an outer diameter of 0.625 inches, bores 84 and 86 are each formed with diameters of 0.485 inches and the grooves 90 and 92 are machined to depths which create controlled wall thicknesses of 0.010 inches ± 0.001 inches.

While the foregoing embodiments are at present considered to be preferred, it is understood that numerous variations and modifications may be made therein by those skilled in the art and it is intended to cover in the appended claims all such variations and modifications as fall within the true spirit and scope of the invention.

What is claimed is:

1. In a system for distributing a fluid under pressure, the combination of a valve body having a cylindrical cavity with an inlet, an outlet and a passageway between the inlet and outlet, distributor means for directing fluid from the outlet to one or more end use locations, a cylindrical flow-blocking member removably mounted within the cavity, said member having a uniform outside diameter commensurate with the inside diameter of the cavity, said member including an imperforate plug and a pair of tubular ends extending axially from the plug, means for detachably and slidably mounting the tubular ends in the passageway for forming a continuation thereof, means forming a pair of axially spaced-apart weakened zones which extend circumferentially around the cylindrical member adjacent respective ends of the plug, charge means mounted in the body for applying an exploding gas directly against the outer surface portion of the flow-blocking member adjacent the plug whereby said outer surface portion and plug shear at weakened zones and separate from the member to form a slug portion which moves along an ejection path which is substantially orthogonal with said passageway whereby after said separation the passageway through the valve body is substantially unobstructed for easy removal of the remaining parts of the flow-blocking member and for replacement of a complete flow-blocking member, deflector means for deflecting the slug portion along a second path inclined from the ejection path for absorbing kinetic energy of the moving slug portion, and means forming a chamber within the valve body in alignment with said second path for receiving said slug portion and holding the latter substantially clear of the passageway whereby flow is established along the passageway to said outlet.

2. A valve as in claim 1 which includes means forming an opening through the body into said slug-receiving chamber, together with a cover removably mounted on the body over the opening, said cover being removable following operation of the valve to permit removal of the sheared slug from the chamber.

3. A system as in claim 1 which includes detent means mounted within said chamber for capturing the ejected slug portion within the chamber and retaining the same out of the flow of fluid along the passageway.

* * * * *